US011821406B1

United States Patent
Toor et al.

(10) Patent No.: US 11,821,406 B1
(45) Date of Patent: Nov. 21, 2023

(54) VERTICAL AXIS WIND TURBINE AND BLADE THEREFOR

(71) Applicant: KING FAHD UNIVERSITY OF PETROLEUM AND MINERALS, Dhahran (SA)

(72) Inventors: Zakria Ghazanfar Toor, Khobar (SA); Haitham M. Bahaidarah, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/830,509

(22) Filed: Jun. 2, 2022

(51) Int. Cl.
*F03D 3/06* (2006.01)
*F03D 3/00* (2006.01)

(52) U.S. Cl.
CPC ............. *F03D 3/062* (2013.01); *F03D 3/005* (2013.01)

(58) Field of Classification Search
CPC ........ F03D 1/0675; F03D 3/005; F03D 3/062; F05B 2240/211–218
See application file for complete search history.

(56) References Cited

U.S. PATENT DOCUMENTS

| | | | |
|---|---|---|---|
| 7,832,689 B2 * | 11/2010 | Prince .................. | F03D 1/0641 244/200.1 |
| 8,128,364 B2 | 3/2012 | Pesetsky | |
| 8,449,255 B2 | 5/2013 | Tadayon et al. | |
| 10,024,300 B2 | 7/2018 | Zuteck et al. | |
| 11,143,163 B2 * | 10/2021 | Juarez ..................... | F03D 9/25 |

FOREIGN PATENT DOCUMENTS

| | | | | |
|---|---|---|---|---|
| CN | 109944737 A | | 6/2019 | |
| DE | 202008006801 U1 | * | 4/2009 | ............. F03D 3/061 |
| DE | 102009013666 A1 | * | 10/2010 | ............. F03D 3/061 |
| GB | 2477509 A | | 8/2011 | |
| WO | WO-2016034614 A1 | * | 3/2016 | ........... F03D 1/0675 |

* cited by examiner

*Primary Examiner* — Christopher R Legendre
(74) *Attorney, Agent, or Firm* — Oblon, McClelland, Maier & Neustadt, L.L.P.

(57) ABSTRACT

A vertical axis wind turbine blade that includes an elongated wing and at least one airflow blocker in the elongated wing. The elongated wing has a first surface and a second surface which meet at a leading edge and a trailing edge, where the leading edge includes a convex curve. The elongated wing also includes a leading edge slat between the first surface and the second surface; and at least one hollow channel extending from the leading edge slat to the first surface. The hollow channel is curved, and the airflow blocker is configured to block the hollow channel.

19 Claims, 7 Drawing Sheets

VERTICAL AXIS WIND TURBINE AND BLADE THEREFOR

BACKGROUND

Technical Field

The present disclosure relates to a vertical axis wind turbine and more particularly relates to a blade of the vertical axis wind turbine.

Discussion of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Wind turbines are used to extract kinetic energy from wind and convert the kinetic energy into electrical energy. Vertical axis wind turbines (VAWTs) are used to extract the kinetic energy from wind for both offshore and onshore applications. VAWTs are known for their omni-directional capability, robust design, and low noise emission with low manufacturing, installation and maintenance cost as compared to horizontal axis wind turbines.

It is important to study aerodynamic characteristics of blades of the VAWTs as the airflow incident on the blades is complex due to dynamic stall phenomena, blade-wake interactions, and flow curvature effects. Decrease in velocity of the blade from low pressure regions formed on an upper surface of the blade may be referred to as stall. The dynamic stall phenomenon involves a succession of flow separations and reattachments which occur on the surface of the blade due to rapid changes in the angle of attack once a static stall angle is exceeded. Typically, blades of VAWTs also experience positive and negative stalls during a single rotation thereof, which impacts performance of the VAWT. Various studies have shown that the performance of a VAWT may be enhanced by delaying the stall and energizing the airflow over the blade entering stall regions.

U. S Pat. Publication No. 2004/0201220A1 describes control of airflow in the vicinity of a leading edge of the blade by controllably injecting fluid flow momentum, to achieve low dynamic stall for the VAWT up to operating conditions with low tip speed ratio. The fluid flow momentum is increased by adding additional momentum with use of a blower or a similar flow affecting unit located on a side of the blade, preferably at the leading edge of the blade.

U.S. Pat. No. 7,537,182 describes method of controlling a shear layer for a fluid dynamic body, such as the blade. The method includes introducing first periodic disturbances into a fluid medium at a first flow separation location and simultaneously introducing second periodic disturbances into the fluid medium at a second flow separation location. A phase difference between the first and second periodic disturbances is adjusted to control flow separation of the shear layer as the fluid medium moves over the blade.

CN104608919A describes a leading-edge slat with a drainage groove and a method of designing the drainage groove. The drainage groove includes a wide inlet formed in a lower surface and a narrow outlet formed in an upper surface in a leading edge slat of an airfoil. By utilizing a pressure difference between the upper and lower surfaces of the leading edge slat, an airflow with high pressure of the lower surface of the leading-edge slat is introduced into the upper surface of the leading-edge slat via the drainage groove.

WO2015113011 describes an aerodynamic slat mounted over a forward suction side of a wind turbine blade and a mechanism that closes or reduces a gap between slat and blade. The reference also describes the use of multi-element airfoils by incorporating aerodynamic load control capabilities. Control logic activates an actuator of the mechanism to close or reduce the gap when wind conditions meet or exceed a predetermined criterion, such as a rated wind condition.

Each of the aforementioned patent reference suffers from one or more drawbacks hindering their adoption. For example, none of the references describe using a leading edge slat with a suction channel to delay stall and achieving reattachment of airflow. One or more of the references also employ sensing or control mechanisms to address drawbacks related to stall, thereby rendering corresponding VAWT blade structures and methods complex.

SUMMARY

According to one aspect of the present disclosure, vertical axis wind turbine blade is disclosed. The vertical axis wind turbine blade includes an elongated wing and at least one airflow blocker in the elongated wing. The elongated wing has a first surface and a second surface which meet at a leading edge and a trailing edge, where the leading edge includes a convex curve. The elongated wing also includes a leading edge slat between the first surface and the second surface; and at least one hollow channel extending from the leading edge slat to the first surface. The hollow channel is curved, and the airflow blocker blocks the hollow channel.

In some embodiments, the vertical axis wind turbine blade is a straight blade. In some embodiments, the leading edge includes a leading edge channel along a length thereof.

In some embodiments, the leading edge slat is wider at the first surface than at the second surface.

In some embodiments, the at least one hollow channel starts at the leading edge. In some embodiments, the at least one hollow channel includes a branch extending from the leading edge slat to the second surface. In some embodiments, the at least one hollow channel is connected to at least one slot on the first surface, where the at least one slot is parallel to a chord of the vertical axis wind turbine blade.

In some embodiments, the at least one airflow blocker is configured to block the at least one hollow channel at the first surface or the second surface. In some embodiments, the at least one airflow blocker is configured to block the leading edge slat. In some embodiments, the at least one airflow blocker is configured to block the at least one hollow channel based on an azimuthal position of the vertical axis wind turbine blade.

According to another aspect of the present disclosure, a vertical axis wind turbine is disclosed. The vertical axis wind turbine includes a vertical axis, at least one blade, and at least one airflow blocker in the at least one blade. The blade includes a first surface and a second surface that meet at a leading edge and a trailing edge, where the leading edge includes a convex curve. The blade further includes a leading edge slat and at least one hollow channel extending from the leading edge slat to the first surface. The at least one hollow channel is curved and the at least one airflow blocker is configured to block the at least one hollow channel. Additionally, the leading edge and the trailing edge are oriented parallel to the vertical axis.

In some embodiments, the at least one blade is attached to the vertical axis via at least one blade strut.

These and other aspects of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

Figure 1:
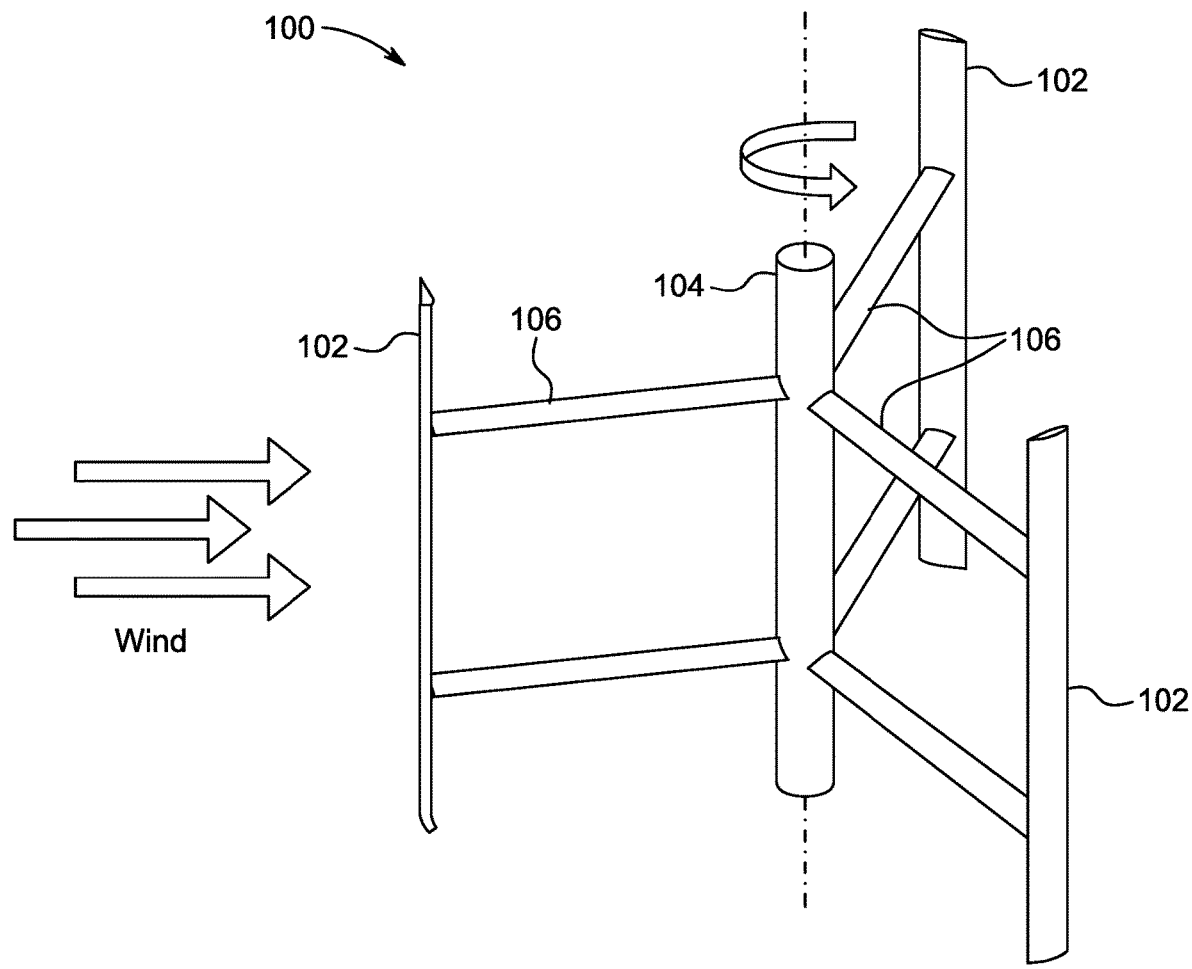
FIG. 1 illustrates a conventional straight bladed vertical axis wind turbine.

In the following description, it is understood that other embodiments may be utilized, and structural and operational changes may be made without departure from the scope of the present embodiments disclosed herein.

Reference will now be made in detail to specific embodiments or features, examples of which are illustrated in the accompanying drawings. Wherever possible, corresponding, or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

FIG. 1 illustrates a conventional straight bladed vertical axis wind turbine 100. Specifically, the turbine 100 includes three blades 102 fixed to a central rotating shaft 104 through struts 106. As the blades 102 rotate about the central rotating shaft 104 under the influence of aerodynamic forces, blades 102 undergo a cyclic variation of angle of attack ($\alpha$), defined as a relative angle between a tangential velocity vector ($\omega R$) and wind direction vector V, during a single rotation of the central rotating shaft 104.

Figure 2:
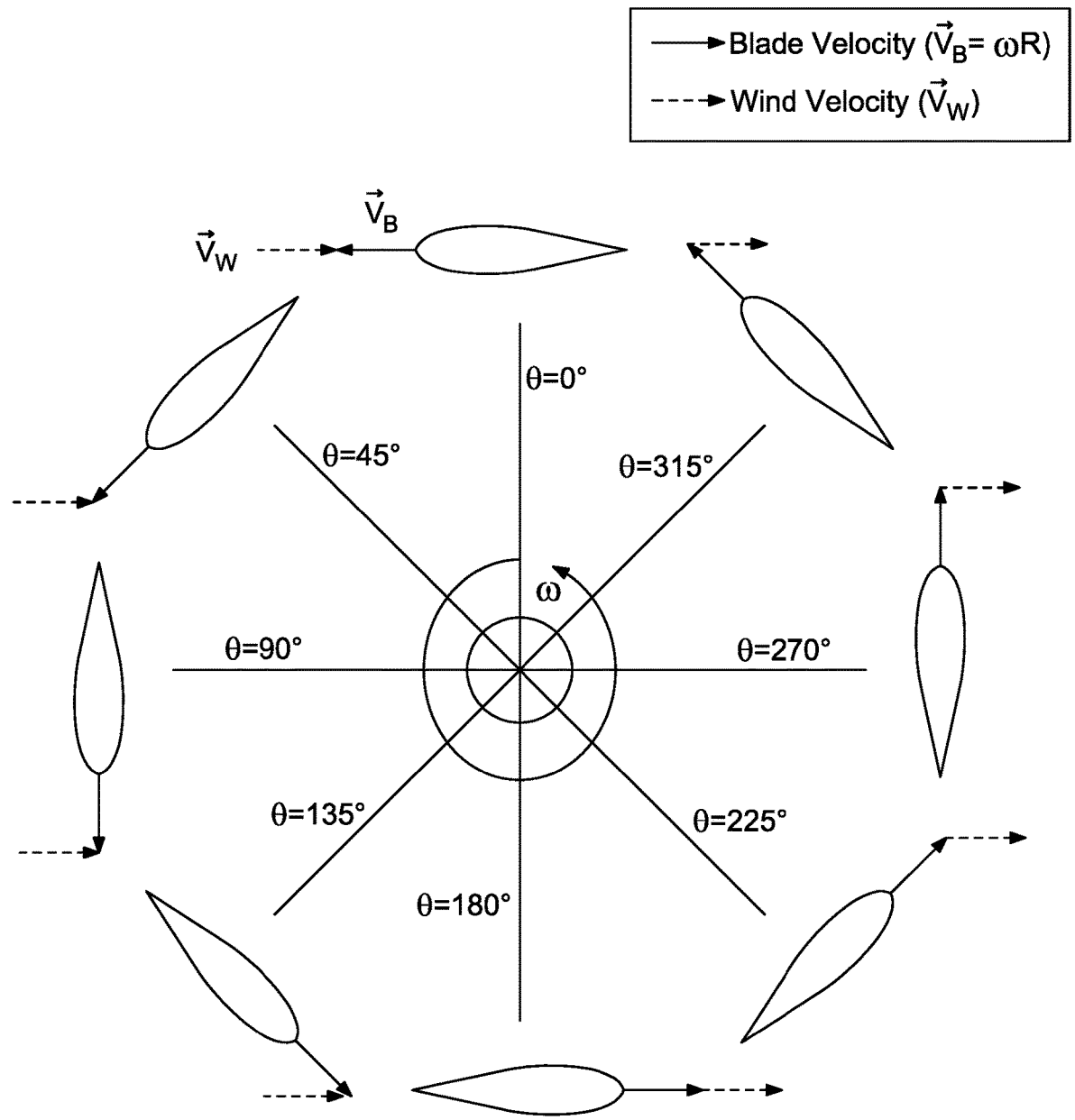
FIG. 2 illustrates a typical variation in the angle of attack ($\alpha$) for different locations in terms of azimuthal angle ($\theta$) in an equatorial plane.

FIG. 2 illustrates a typical variation in the angle of attack ($\alpha$) for different locations in terms of azimuthal angle ($\theta$) in an equatorial plane. The variation in velocity vectors at different azimuthal angle ($\theta$) is shown in terms of blade tangential velocity vector ($V_B = \omega R$) and the wind direction vectors $V_W$. Consequently, the blades 102 undergo a cyclic variation of the angle of attack ($\alpha$). A magnitude of such cyclic pitch variation is a direct function of speed of the turbine 100 and speed of wind incident on the blades 102.

Figure 3:
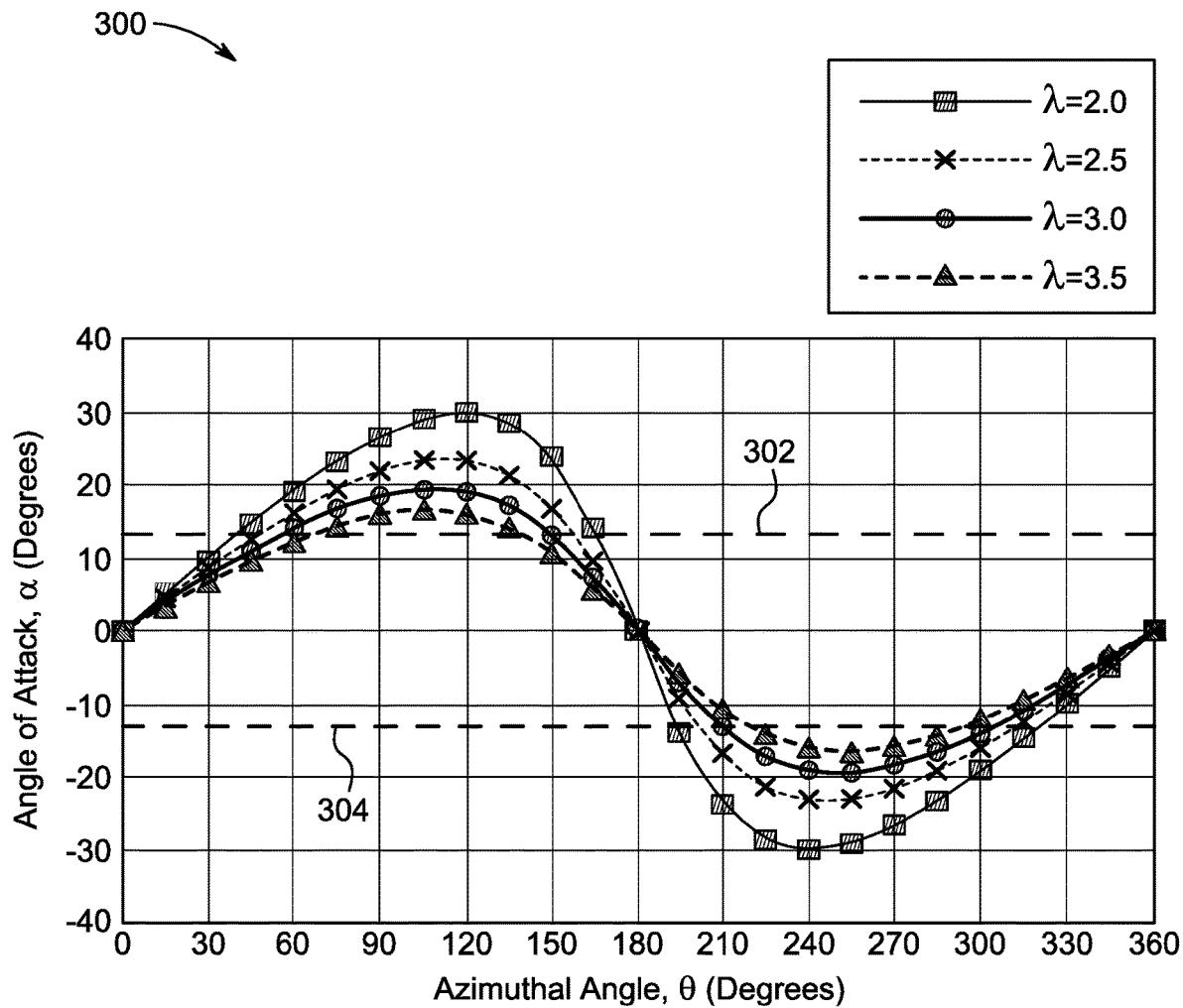
FIG. 3 illustrates a graph of variation of angle of attack ($\alpha$) as a function of azimuthal angle ($\theta$) at various tip speed ratios ($\lambda$), according to an aspect of the present disclosure.

FIG. 3 illustrates a graph 300 of variation of the angle of attack ($\alpha$) as a function of the azimuthal angle ($\theta$) at various tip speed ratios ($\lambda$). The term "tip speed ratio" is defined as a ratio of speed of the tips of the blades 102 to speed of airflow stream incident on the tips. Typically, the blades 102 experience positive stall and negative stall during a single rotation of the central rotating shaft 104 due to the variation in the angle of attack ($\alpha$). A first horizontal dash line 302 in the graph 300 represents the positive stall and a second horizontal dash line 304 represents the negative stall experienced by the blades 102 due to variation in the angle of attack ($\alpha$).

As the turbine 100 operates beyond the positive stall and the negative stall, the turbine 100 experiences flow separation on surface of the blades 102 and, hence, performance degradation. During continuous operation of the turbine 100, the blades 102 experiences a cyclic variation in the angle of attack ($\alpha$) as illustrated in FIG. 2. The blades 102 stall as the angle of attack ($\alpha$) exceeds the positive stall and recovers as the angle of attack ($\alpha$) reduces during its operation. Such stall and recovery processes are experienced twice during one rotation of the blades 102 about the central rotating shaft 104, each for the positive stall and the negative stall.

Figure 4:
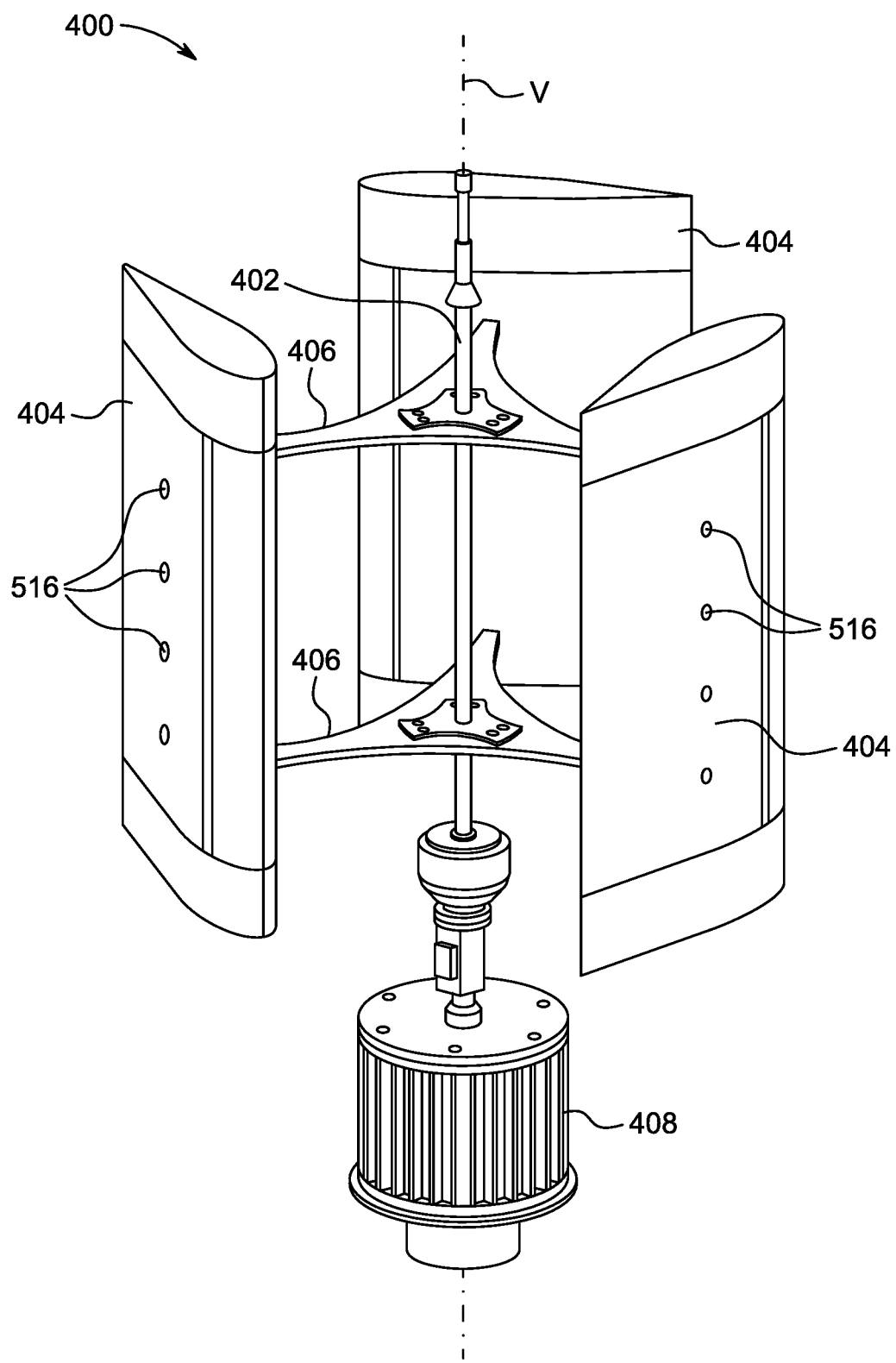
FIG. 4 illustrates a vertical axis wind turbine, according to an aspect of the present disclosure.

FIG. 4 illustrates a vertical axis wind turbine 400, according to an embodiment of the present disclosure. The turbine 400 includes a central rotating shaft 402 extending along a vertical axis "V", and multiple blades 404 attached to the central rotating shaft 402 via blade strut 406. The blades may be attached to the blade strut 406 via screws. The blade strut may be attached to the central rotating shaft 402 with screws. The central rotating shaft 402 may be perpendicular to the ground and the vertical axis V. The central rotating shaft 402 is coupled to an electrical generator 408 that is configured to extract power from rotation of the blades 404 about the vertical axis "V". In one aspect, the blades 102 of FIG. 1 may be replaces with the blades 404 of FIG. 4 to achieve the configuration of the turbine 400. In one embodiment, the wind turbine 400 may be an H-turbine, wherein the blades are attached to the central rotating shaft 402 with at least one horizontal blade strut. In one embodiment, the at least one horizontal blade strut may be attached to the middle of the blade. In one embodiment, the blade struts 406 may be attached along the length of the blade, as illustrated in FIG. 4. In one embodiment, the blade struts 406 may be attached at the ends of the blade.

In one embodiment, the pitch of the blades may be adjusted during operation. The at least one actuator may adjust the speed of the blades by adjusting the blade pitch. For example, the blades may be feathered based on environmental conditions (e.g., wind speed). Feathering the blades may require the pitch and/or position of the blades to be adjusted simultaneously. In one embodiment, the pitch of the blades may be adjusted using at least one actuator. In one embodiment, the at least one actuator may be controlled using a closed-loop control system. In one embodiment, the blades may swing or rotate around the blade strut attachment. In one embodiment, the blades may be fixed to the blade strut such that the wind turbine may rely on a passive system for improving airflow without adjusting the angle of attack of the blade.

In one embodiment, the generator 408 may be a direct current (DC) generator. In one embodiment, the generator 408 may convert DC power to alternating current (AC) power. The generator 408 maybe a synchronous generator or an induction generator. The generator may be a permanent magnet generator or a wound generator. In one embodiment, the generator may convert electrical power into mechanical power. In one embodiment, the turbine 400 may include a gear box wherein the gear box is configured to convert a rotational speed of the blade to a higher rotational speed for the generator 408. In one embodiment, the turbine may be a direct drive wind turbine. In one embodiment, airflow measurement equipment may be attacked to the generator and/or the central rotating shaft. In one embodiment, the wind turbine may be a small-scale wind turbine. In one embodiment, the wind turbine may be a large-scale wind turbine.

Figure 5:
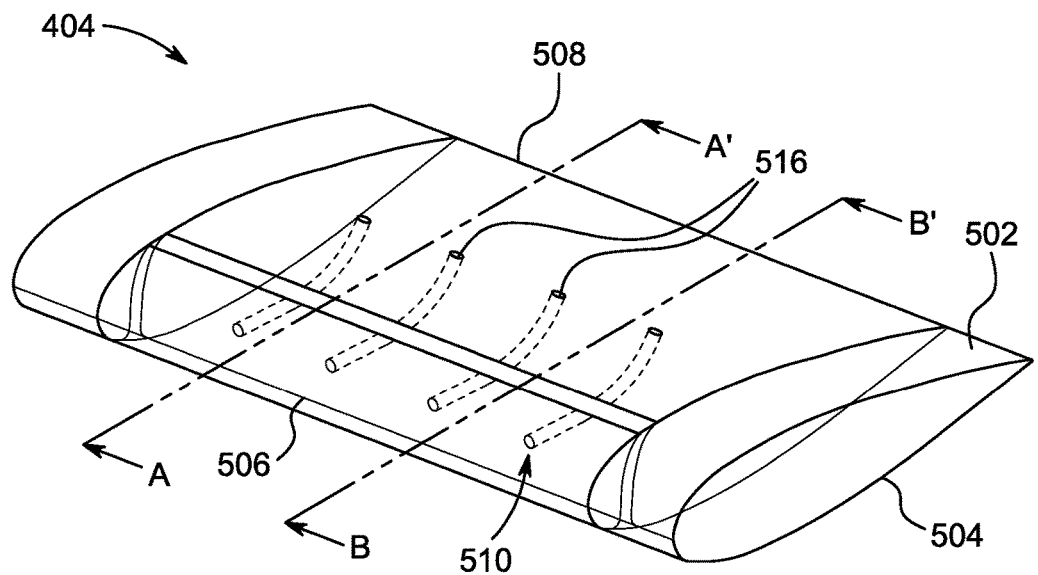
FIG. 5 illustrates a perspective view of a blade of the vertical axis wind turbine of FIG. 4, according to an aspect of the present disclosure.

FIG. 5 illustrates a perspective view of the blade 404, according to an embodiment of the present disclosure. The blade 404 is embodied as an elongated wing and a straight blade. The blade 404 includes a first surface 502 and a second surface 504, both meeting at a leading edge 506 and a trailing edge 508. In an assembled condition of the turbine 400, the leading edge 506 and a trailing edge 508 are oriented parallel to the vertical axis "V". Particularly, the leading edge 506 includes a convex curve as seen in FIG. 5. In one embodiment, the blade 404 may also include a leading edge slat 510, and at least one hollow channel extending from the leading edge slat 510 to the first surface 502.

The at least one hollow channel may be a curved channel. In one embodiment, the curvature of the at least one hollow channel may be approximately equal to a curvature of the second surface 504. In one embodiment, the blade 404 may include a plurality of hollow channels wherein the plurality of hollow channels are equally spaced across the blade. The at least one hollow channel may terminate at a slot 516 on the first surface 502 of the blade. In one embodiment, the slot 516 may be positioned along a chord of the blade between the leading edge and the trailing edge. In one embodiment, the slot 516 may be positioned at the widest part of the blade. In one embodiment, the at least one hollow channel may terminate along the middle, e.g., the middle third, of the first surface 502 of the blade. In one embodiment, the at least one hollow channel may terminate at a slot 516 on the first surface 502 of the blade between 30% to 60% of the width of the first surface 502. In one embodiment, the length of the at least one hollow channel may be proportional to the length or width of the blade. In one embodiment, the at least one hollow channel may begin at a midpoint of the leading edge slat 510.

In one embodiment, the leading edge slat 510 may extend towards the trailing edge of the blade over the first surface or the second surface. For example, the leading edge slat 510 may cover a portion of the first surface or the second surface of the blade while following the curvature of the first surface or the second surface. In an embodiment, the blade 404 defines a leading edge channel extending along the leading edge slat 510 and between the leading edge slat 510 and the body of the blade. Particularly, the leading edge channel extends for a portion of the length of the blade. In one embodiment, the leading edge channel may begin at the leading edge of the blade. In one embodiment, the leading edge channel may include an inlet from the leading edge of the blade. In one embodiment, the blade 404 may include at least one airflow blocker. The at least one airflow blocker may control airflow through the leading edge slat, the leading edge channel, and/or the at least one hollow channel.

In one embodiment, the blade may be a straight blade. For example, the blade may be a Darrieus straight blade. In one embodiment, the blade may be a drag-type blade. The blade may have a uniform thickness along the leading edge and a uniform thickness along the trailing edge. The blade may have a consistent taper from the leading edge to the trailing edge. In one embodiment, a curvature of the first surface of the blade may be different from a curvature of the second surface of the blade. The blade may be made from composite materials, including, but not limited to, fiberglass, polyester, epoxy, carbon fiber, aramid, natural composites, and hybrid composites. In one embodiment, the blade may be reinforced, e.g., with fiberglass. In one embodiment, the blade may include wood compounds, e.g., wood-epoxy, wood-fiber-epoxy. The blade may be made from a combination of materials, e.g., in a sandwich structure. In one embodiment, the blade may include a winglet or wing tip.

In one embodiment, the at least one airflow blocker may include at least one membrane. The at least one membrane may be porous. In one embodiment, the at least one membrane may include channels for air to pass through a channel in the blade. The channel in the blade can include at least one of the leading edge slat, the leading edge channel, and the at least one hollow channel. The channels of the at least one membrane may be oriented at an angle wherein the angle of the channels enables air to pass through the channel in the blade depending on a position of the blade. In one embodiment, the angle of the channels may change. For example, the angle of the channels may change based on a position of the blade. The channels may be open when the position of the blade results in stall. In one embodiment, the at least one membrane may include multiple layers. In one embodiment, each layer may include a filter wherein the filter includes channels for airflow. In one embodiment, the number of filters and/or the angle of filters may be used to control airflow through the channel in the blade. For example, filters may be combined to block airflow. In another example, filters may be used to direct airflow in one angle. In one embodiment, the at least one airflow blocker may include at least one valve. The at least one valve may partially or fully block air through a channel. In one embodiment, the at least one airflow blocker may be attached to the leading edge slat. In one embodiment, the at least one airflow blocker may be attached to the first surface or the second surface of the blade.

Figure 9:
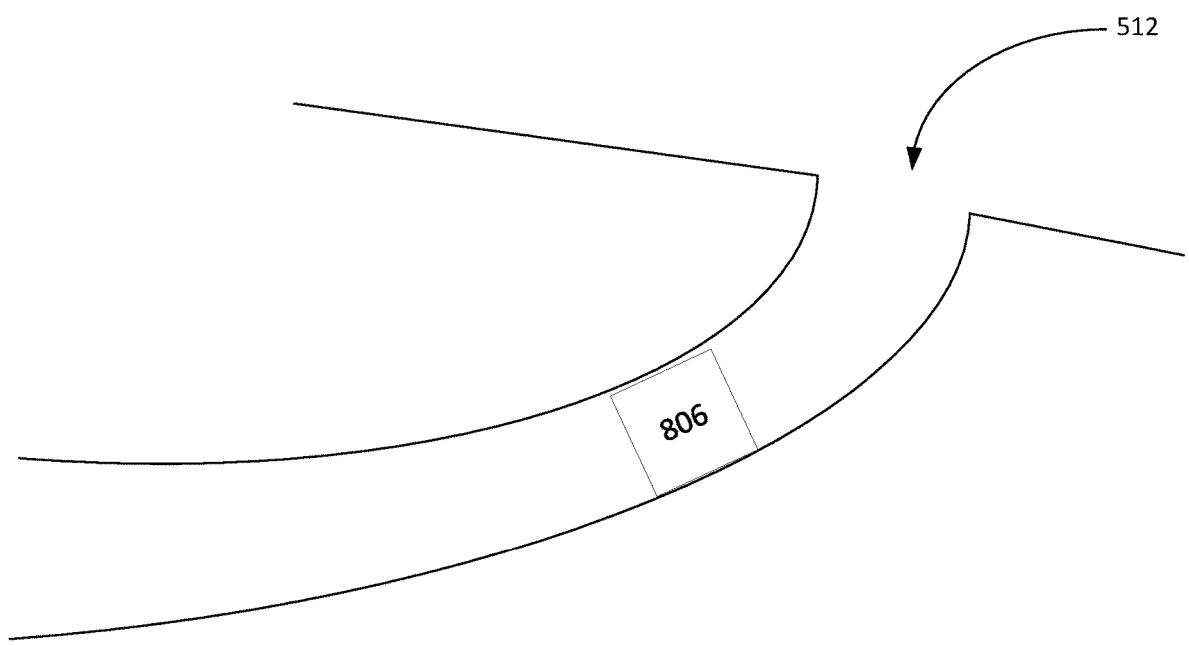
FIG. 9 illustrates a schematic of an airflow blocker, according to some aspects of the present disclosure.

FIG. 9 is an exemplary schematic of the airflow blocker 806, according to one embodiment of the present disclosure. The airflow blocker 806 may be disposed in the hollow channel 512, as illustrated in FIG. 9. The airflow blocker may control airflow through the at least one hollow channel 512.

In one embodiment, the at least one airflow blocker may be controlled by an active mechanism. The active mechanism may include at least one sensor, e.g., at least one airflow sensor, at least one position sensor. In one embodiment, the at least one sensor may be positioned on the surface of the blade. In one embodiment, the at least one sensor may be placed inside the at least one hollow channel, the leading edge channel, and/or the leading edge slat. The active mechanism may open and close the at least one airflow blocker based on the angle of attack or airflow as detected by the at least one airflow sensor. In one embodiment, the active mechanism may open and close the at least one air flow blocker based on a velocity of air as detected by the at least one airflow sensor. In one embodiment, the at least one position sensor may detect a position of the blade. The active mechanism may open and close the at least one airflow blocker based on the position of the blade. In one embodiment, the active mechanism may open and close the at least one airflow blocker cyclically based on an expected stall or position of the blade. The expected stall may be a function of the speed of the turbine and the shape and orientation of the blade. In one embodiment, the active mechanism may adjust an angle of the at least one airflow blocker. In one embodiment, the active mechanism may engage a shield or plug to block air flow in the leading edge channel and/or the at least one hollow channel. In one embodiment, the active mechanism may include a pump to redirect air flowing through the blade.

Figure 6:
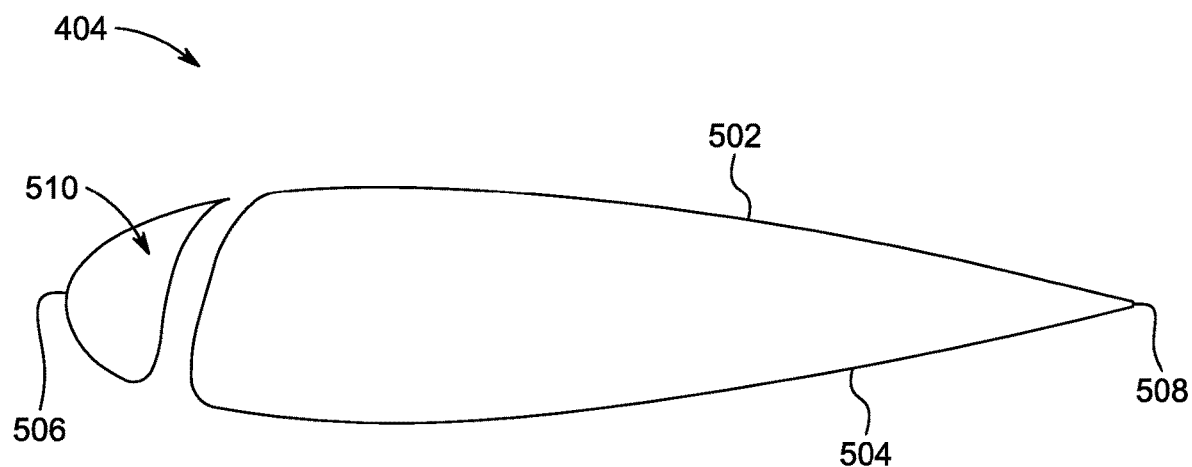
FIG. 6 illustrates a cross-section of the blade considered at a section A-A' in FIG. 5, according to an aspect of the present disclosure.

FIG. 6 illustrates a cross-section of the blade 404 considered at a section A-A' in FIG. 5. In an embodiment, the leading edge slat 510 is wider at the first surface 502 than at the second surface 504 of the blade 404. In some embodiments, the leading edge slat 510 may be moved in at least one of a linear direction (represented by arrow "L") and/or rotational direction (represented by arrow "R") with respect to remaining portion of the blade 404. In some embodiments, the leading edge slat 510 may be retracted towards the remaining portion of the blade 404. In some embodiments, the turbine 400 may include an actuator (not shown), controlled by a controller (not shown), to actuate movement of the leading edge slat 510 with respect to the remaining portion of the blade 404. In a non-limiting example, the actuator may be implemented as one of a hydraulic actuator, a pneumatic actuator, or an electrical actuator. In such arrangement, the movement of the leading edge slat 510 may be controlled based on at least one of the angle of attack and the azimuthal angle (θ) of the blade 404. In some embodiments, the at least one airflow blocker may be configured to block the leading edge slat 510.

Figure 7:
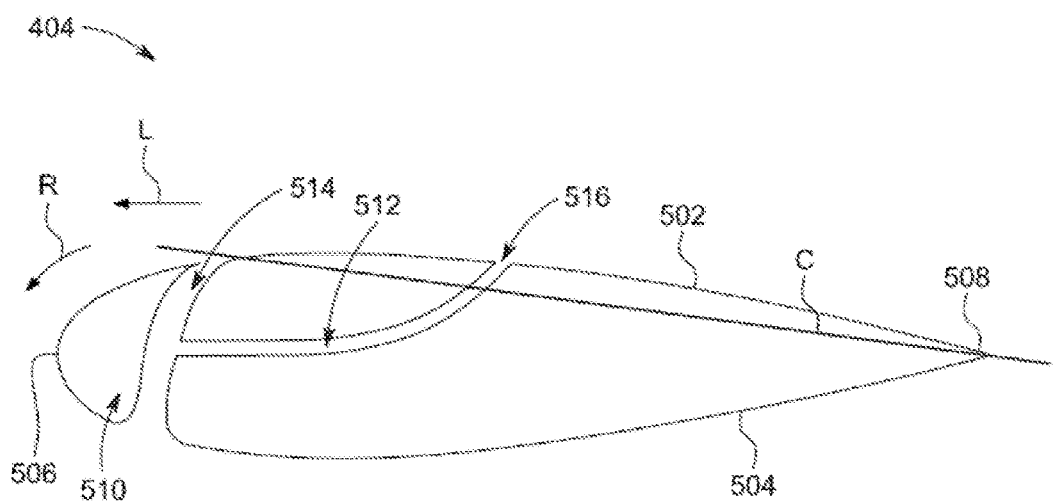
FIG. 7 illustrates a cross-section of the blade considered at a section B-B' in FIG. 5, according to an aspect of the present disclosure.

FIG. 7 illustrates a cross-section of the blade 404 considered at a section B-B' in FIG. 5. The hollow channel 512 is curved in the blade 404. In an embodiment, the hollow channel 512 may begin from the leading edge 506 of the blade 404. In some embodiments, the first surface 502 of the blade 404 defines multiple slots 516 (also shown in FIG. 4 and FIG. 5). Preferably, each slot 516 at the first surface 502 is defined along a chord "C" of the blade 404. In some embodiments, the at least one airflow blocker may be configured to block the hollow channel 512 based on the azimuthal angle (θ) of the blade 404. A position of the blade 404 corresponding to an azimuthal angle (θ) of the blade 404 is referred to as "the azimuthal position" of the blade 404, as used in the present disclosure.

During rotation of the blade 404 about the central rotating shaft 402, for example at azimuthal angles θ=270° and θ=315°, the airflow enters the leading edge channel 514 at the second surface 504 of the blade 404. Typically, the leading edge channel 514 narrows from the second surface 504 towards the first surface 502 of the blade 404. As such, a high pressure stream of air entering the leading edge channel 514 at the second surface 504 of the blade 404 accelerates through the leading edge channel 514 and, hence, pressure of the airflow is reduced. The air stream associated with low pressure is introduced directly into a boundary layer of the first surface 502 of the blade 404. Further, the low pressure air stream connects with a downstream region along the first surface 502 of the blade 404, thereby developing a suction effect. Such suction effect aids in early reattachment of the air stream once the angle of attach reduces after the stall. According to an aspect, a combined effect of such stall delay and the early reattachment of the air stream enhances power output performance of the turbine 400.

Figure 8:
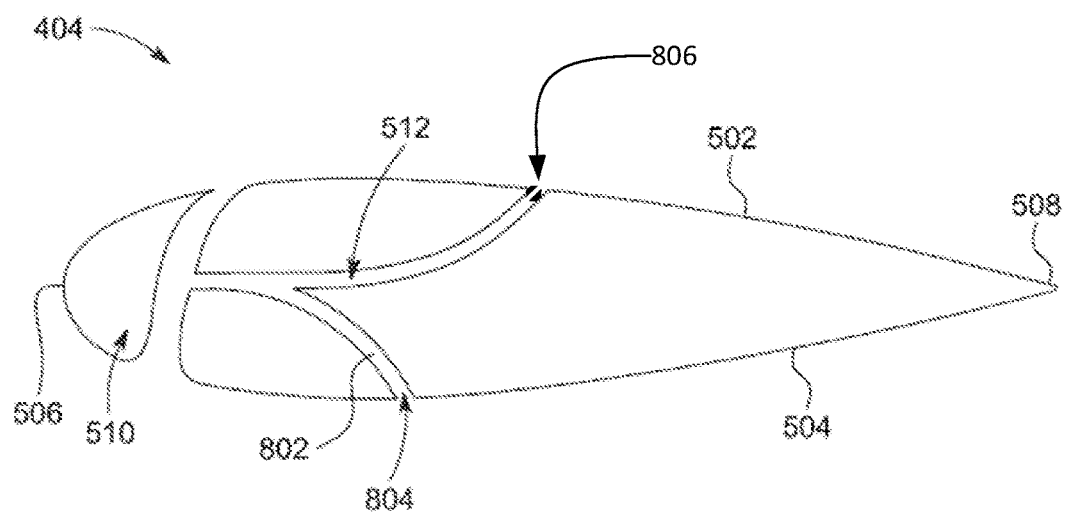
FIG. 8 illustrates a cross-section of the blade, according to some aspects of the present disclosure.

FIG. 8 illustrates a cross-section of the blade 404, according to another embodiment of the present disclosure. The hollow channel 512 includes a branch 802 extending from the leading edge slat 510 to the second surface 504 of the blade 404. As such, the second surface 504 of the blade 404 may define another set of slots 804, such that the branch 802 fluidly communicates with the leading edge slat 510 and the second surface 504 of the blade 404. In some embodiments, the at least one airflow blocker 806 may be configured to block the hollow channel 512 at the first surface 502 or the second surface 504 of the blade 404. The airflow blocker 806 may be disposed on the first surface 502 of the blade 404 to block the periphery of the slots 516. Similarly, in some embodiments, the airflow blocker may be disposed on the second surface 504 of the blade 404 to block the periphery of the slots 804, thereby at least partially blocking the hollow channel 512 and the branch 802 defined in the blade 404.

The hollow channel 512 and the branch 802 also allow the high pressure air stream from the leading edge channel 514 to reach the first surface 502 of the blade 404, thereby allowing early reattachment of the air stream with the boundary layer at the first surface 502. Such configuration of the blade 404 may expedite the reattachment as the blade 404 recovers from the stall. Additionally, such flow through the hollow channel 512 and the branch 802 energizes the airflow, thereby rendering it turbulent and delaying flow separation.

To this end, the blade 404 of the present disclosure achieves a compound effect of stall delay and early reattachment of the airflow with the aid of multiple channels, such as the leading edge channel 514, the hollow channel 512, and the slots 516, which directly fluidly connects with the first surface 502.

As used herein, the terms "a" and "an" and the like carry the meaning of "one or more."

Obviously, numerous modifications and variations of the present invention are possible in light of the above teachings. It is, therefore, to be understood that, within the scope of the appended claims, the invention may be practiced otherwise than as specifically described herein.

The invention claimed is:

1. A vertical axis wind turbine blade, comprising:
an elongated wing having a first surface and a second surface, the first surface and the second surface meeting at a leading edge and a trailing edge, wherein the leading edge comprises a convex curve; and
at least one airflow blocker in the elongated wing,
wherein the elongated wing comprises:
a leading edge slat formed by the leading edge, the first surface, and the second surface and delimited by a leading edge channel, the leading edge slat being contained within a first side wall of the elongated wing and a second side wall of the elongated wing and being wider at the first surface than at the second surface; and at least one hollow channel extending from the leading edge channel at a midpoint of the leading edge slat to the first surface, wherein the at least one hollow channel is curved, and wherein the at least one airflow blocker includes at least one channel, wherein the at least one airflow blocker includes a plurality of angled filter layers, and wherein the at least one airflow blocker is configured to obstruct airflow through the at least one hollow channel.

2. The vertical axis wind turbine blade of claim 1, wherein the leading edge channel is disposed along a length of the leading edge slat.

3. The vertical axis wind turbine blade of claim 2, wherein the at least one hollow channel includes a branch in fluid communication with the leading edge channel that extends to the second surface.

4. The vertical axis wind turbine blade of claim 3, wherein the at least one airflow blocker is configured to block the at least one hollow channel at the first surface or the second surface.

5. The vertical axis wind turbine blade of claim 2, wherein the at least one airflow blocker is located in the leading edge channel and wherein the at least one airflow blocker is configured to obstruct airflow through the leading edge channel.

6. The vertical axis wind turbine blade of claim 1, wherein the at least one hollow channel is connected to at least one slot on the first surface, and wherein the at least one slot is positioned along a chord of the vertical axis wind turbine blade.

7. The vertical axis wind turbine blade of claim 1, further comprising an airflow sensor disposed in the at least one hollow channel and/or the leading edge channel.

8. The vertical axis wind turbine blade of claim 7, wherein the airflow sensor is disposed in the at least one hollow channel and wherein the airflow sensor is configured to detect an angle of attack of against the vertical axis wind turbine blade.

9. The vertical axis wind turbine blade of claim 1, wherein the vertical axis wind turbine blade is a straight blade.

10. A vertical axis wind turbine, comprising:
a central rotating shaft;
at least one blade having a first surface and a second surface, the first surface and the second surface meeting at a leading edge and a trailing edge, wherein the leading edge comprises a convex curve; and
at least one airflow blocker in the at least one blade, wherein the at least one blade comprises:

a leading edge slat, formed by the leading edge, the first surface, and the second surface and delimited by a leading edge channel the leading edge slat being contained within a first side wall of the elongated wing and a second side wall of the elongated wing and being wider at the first surface than at the second surface; and at least one hollow channel extending from the leading edge channel at a midpoint of the leading edge slat to the first surface, wherein the at least one hollow channel is curved, and wherein the at least one airflow blocker includes at least one channel, wherein the at least one airflow blocker includes a plurality of angled filter layers, and wherein the at least one airflow blocker is configured to obstruct airflow through the at least one hollow channel, and wherein the leading edge and the trailing edge are oriented parallel to a vertical axis of the central rotating shaft.

11. The vertical axis wind turbine of claim 10, wherein the at least one blade is attached to the central rotating shaft via at least one blade strut.

12. The vertical axis wind turbine of claim 10, wherein the leading edge channel disposed along a length of the leading edge slat.

13. The vertical axis wind turbine of claim 12, wherein the at least one hollow channel includes a branch in fluid communication with the leading edge channel that extends to the second surface.

14. The vertical axis wind turbine of claim 13, wherein the at least one airflow blocker is configured to block the at least one hollow channel at the first surface or the second surface.

15. The vertical axis wind turbine of claim 12, wherein the at least one airflow blocker is located in the leading edge channel and wherein the at least one airflow blocker is configured to obstruct airflow through the leading edge channel.

16. The vertical axis wind turbine of claim 10, wherein the at least one hollow channel is connected to at least one slot on the first surface, and wherein the at least one slot is parallel to a chord of the at least one blade.

17. The vertical axis wind turbine of claim 10, further comprising an airflow sensor disposed in the at least one hollow channel and/or the leading edge channel.

18. The vertical axis wind turbine of claim 17, wherein the airflow sensor is disposed in the at least one hollow channel and wherein the airflow sensor is configured to detect an angle of attack against the at least one blade.

19. The vertical axis wind turbine of claim 10, wherein the at least one blade is a straight blade.

\* \* \* \* \*